United States Patent

[11] 3,578,909

[72] Inventors Eric A. Von Hippel
Weston, Mass.;
Charles C. Stimus, Jr., Danbury, Conn.
[21] Appl. No. 753,542
[22] Filed Aug. 19, 1968
[45] Patented May 18, 1971
[73] Assignee Graphic Sciences, Inc.
Danbury, Conn.

[54] PAPER FEED CABLE INDEXING SYSTEM
18 Claims, 13 Drawing Figs.

[52] U.S. Cl. .......... 178/7.6, 242/67.1, 242/107
[51] Int. Cl. .......... H04n 3/04
[50] Field of Search .......... 178/7.6 (X); 242/107, 67.1, (Inquired); 178/6, 7.6

[56] References Cited
UNITED STATES PATENTS
2,435,250 2/1948 Tandler et al. .......... 178/7.6X
2,538,849 1/1951 Rustad .......... 178/7.6X
2,567,307 9/1951 Wise et al. .......... 178/7.6X

*Primary Examiner*—Robert L. Griffin
*Assistant Examiner*—Richard K. Eckert, Jr.
*Attorney*—Blair, Cesari and St. Onge ABSTRACT: A portable facsimile transmitter and receiver has a rotatable, cylindrical drum for receiving a document which is to be reproduced by means of reading and reproducing heads adjacent the drum. Flexible crossbands bridged across cables wound helically around opposite edges of the drum hold the document on the drum during a reproduction cycle; the cables unwind from the drum during loading and unloading. For ease of loading, the drum is spring wound; a safety stop is provided to prevent premature reverse rotation of the drum during loading or unloading. A margin control enables adjustment of the reproduction cycle to accommodate documents of differing length. An arm extends against the drum when the drum rotation is to be stopped and locks the drum in a reference position at the end of each reproduction cycle to facilitate loading and unloading.

Patented May 18, 1971 3,578,909

6 Sheets-Sheet 1

INVENTORS
ERIC A. VON HIPPEL
CHARLES C. STIMUS, JR.
BY Blair, Cesari & St. Onge
ATTORNEYS INVENTORS
ERIC A. VON HIPPEL
CHARLES C. STIMUS, JR.
BY Blair, Cesari & St. Onge
ATTORNEYS INVENTORS
ERIC A. VON HIPPEL
CHARLES C. STIMUS, JR
BY Blair, Cesari & St. Onge
ATTORNEYS INVENTORS
ERIC A. VON HIPPEL
CHARLES C. STIMUS, JR.
BY *Blair, Cesari & St. Onge*
ATTORNEYS INVENTORS
ERIC A. VON HIPPEL
CHARLES C. STIMUS, JR.
BY Blair, Cesari & St. Onge
ATTORNEYS

PAPER FEED CABLE INDEXING SYSTEM

BACKGROUND OF THE INVENTION

1. Field of the Invention

The invention relates to a facsimile system and more particularly to an improved document loader and unloader for a portable facsimile transmitter and receiver. The present application discloses an improved version of a drum loader of the type described in U.S. Pat. application Ser. No. 19,542 filed Mar. 19, 1970 which is a continuation of application Ser. No. 689,641, filed Dec. 11, 1967, now abandoned and assigned to the assignee of the present invention.

2. Prior Art

Facsimile systems are used to reproduce a document at a remote location. This is accomplished by moving a "reading" head over a document and generating signals indicative of the presence or absence of indicia in each segment of the document. These signals are then transmitted to the remote receiver where they are utilized to reproduce the original document. This reproduction may be made by an optical element in conjunction with photosensitive paper, by a pyrographic stylus in conjunction with specially treated paper, or by other means.

Prior facsimile systems are heavy, bulky and therefore not readily portable. They generally suffer one or more disadvantages which lessen their utility and which rule them out for use as small, lightweight, reliable, portable facsimile systems. Among these disadvantages are the difficulty of loading and unloading a document for reproduction. This is a bothersome problem when a rotating cylindrical drum is used to carry the document being reproduced, since care must be taken to disengage the drum drive and to properly position the document on the drum. It is especially a problem when a rotating drum is to be used in connection with a pyrographic stylus, which must be in contact with the document during reproduction, since loading mechanisms which insulate the document from contact with the stylus cannot be used. Thus, it is especially desirable to provide a simplified document loader (which hereinafter should be understood to accomplish document unloading as well) in portable facsimile systems which are to be used by persons with little or no mechanical skill.

The time required to reproduce a document is proportional to the length of the document. When documents of differing length are to be reproduced, or when portions only of a document are to be reproduced, it is desirable to be able to vary the length of the reproduction cycle in accordance with the length of the document, or document portion, to be reproduced. Many prior systems are deficient in this respect in that they fail to provide an adequate means of automatically adjusting the reproduction cycle to the document, or document portion, to be reproduced.

BRIEF SUMMARY OF THE INVENTION

Objects

Accordingly, it is an object of the invention to provide a document loader for a facsimile system.

Another object of the invention is to provide an improved document loader for a lightweight, compact, portable facsimile system incorporating a transmitter and receiver.

A further object of the invention is to provide an improved document loader which is reliable in operation, simple to use, and which requires little or no mechanical skill on the part of the user.

Still a further object of the invention is to provide facsimile apparatus in which the duration of the reproduction cycle can be varied to accommodate documents of differing lengths.

Yet another object of the invention is to provide facsimile apparatus having positive stopping means to lock the drum in the same angular position after each reproduction cycle to thereby facilitate loading.

Other objects of the invention will in part be obvious and will in part appear hereinafter.

Brief Summary

The invention accordingly comprises the features of construction, combinations of elements, and arrangement of parts which will be exemplified in the constructions hereinafter set forth, and the scope of the invention will be indicated in the claims.

In accordance with the invention, the document to be reproduced (or the sheet on which the reproduction is to be made) is held flat against the drum by a pair of crossbands bridged axially across the drum. The bands are connected at their ends to a pair of cables wound in helical grooves at opposite ends of the drum and have free ends held in notches in the drum. A slidable drawer mounted below the drum carries a pair of arms which contact the free ends of the cables as the drawer is moved outwardly and which unwind the cables from the drum. Thus, when the drawer is fully extended, the crossbands lie flat against its surface and the document is placed directly on them. The drawer is then moved inwardly and the drum, which is spring loaded, rewinds the cables onto itself and, in doing so, carries the document onto its surface.

A pin extending between the hub and the drum acts as a drum lock and prevents drum rotation until the arms are in position to contact the cables. This prevents the drum spring from freely whipping the drum about its axis prior to unloading. The locking pin is released by a lifter mechanism which is actuated by the motion of the drawer. A solenoid-actuated brake stops the drum in the same angular position after each reproduction cycle to thereby facilitate loading and unloading. The length of each reproduction cycle is controlled by a margin stop.

The above and other further objects and features of the invention will become more readily apparent from the following detailed description of the invention when taken in connection with the accompanying drawings in which:

FIGS. 1 and 2 are perspective views of the facsimile system with portions broken away to show the novel loader in more detail;

FIGS. 3 and 4 are side and front sectional views along the lines 3–3 and 4–4 respectively of FIG. 2 showing portions of the loader in greater detail;

Figure 11:
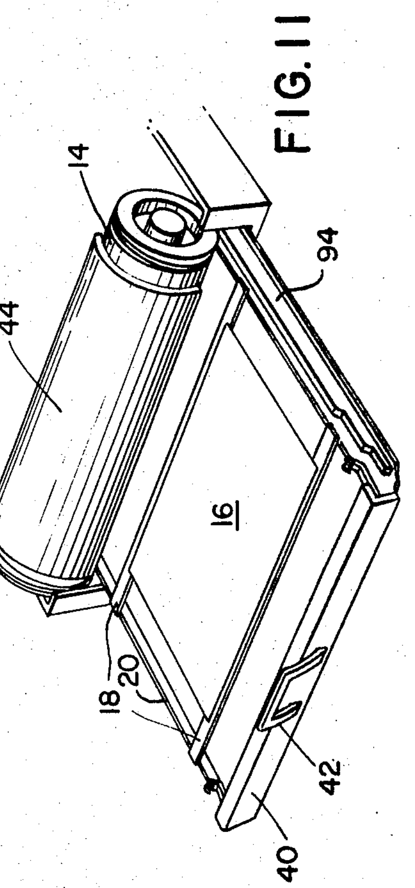
Figure 10:
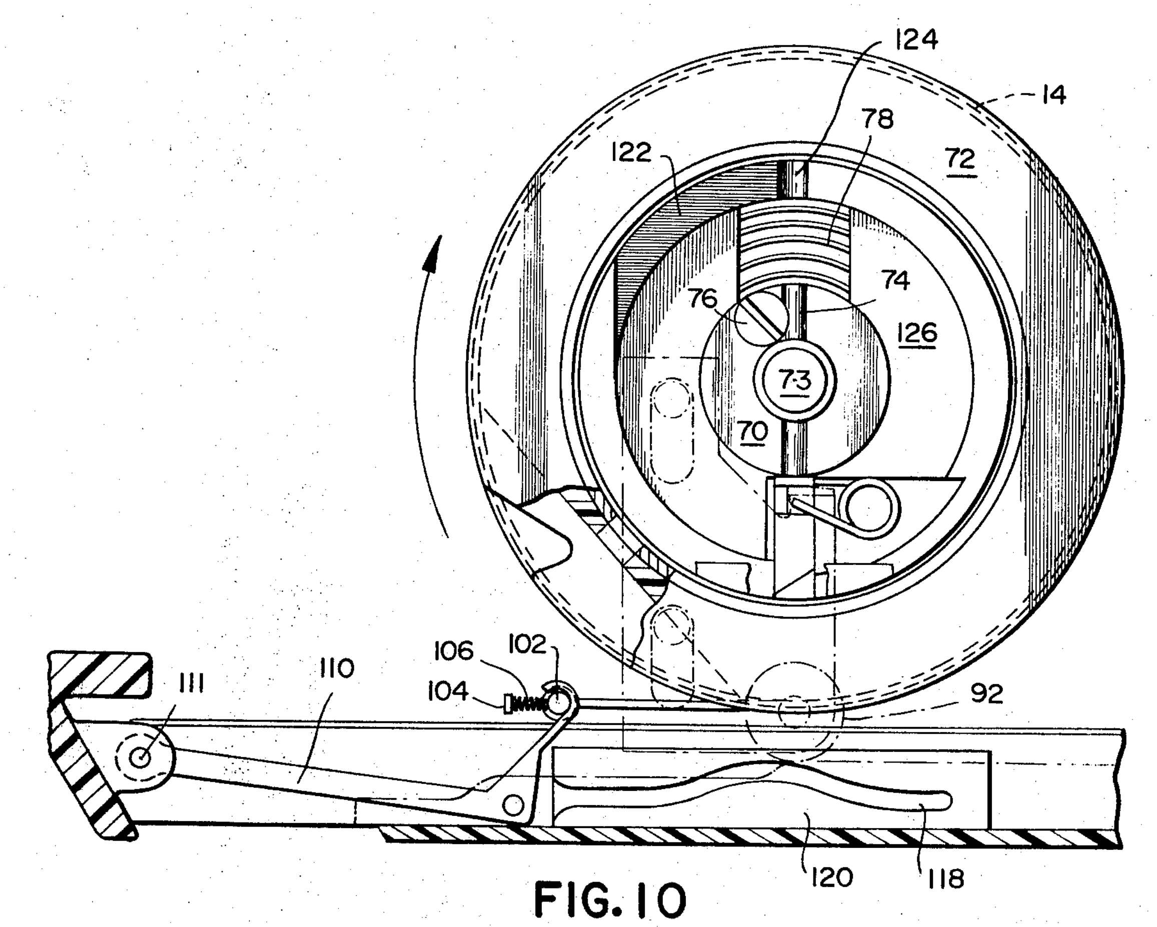
Figure 8:
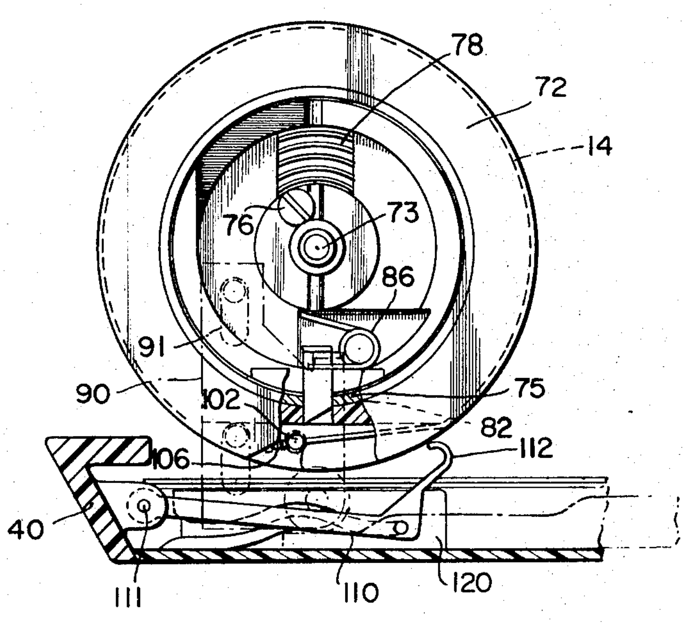
Figure 9:
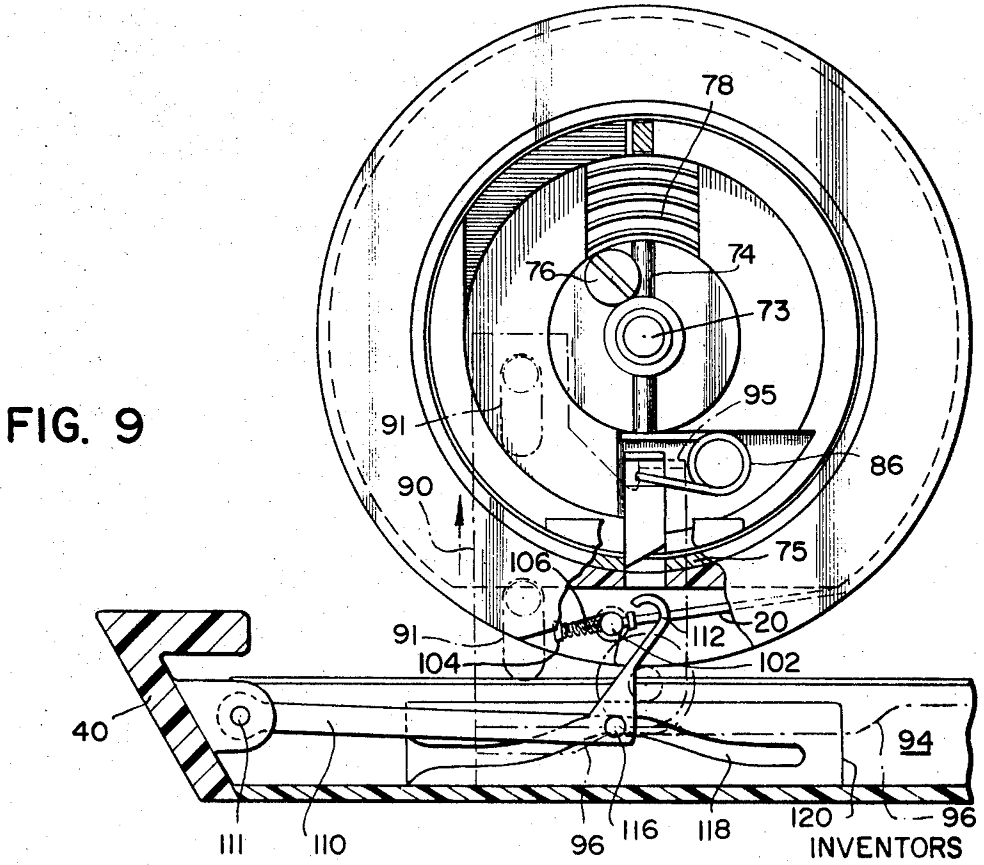
Figure 12:
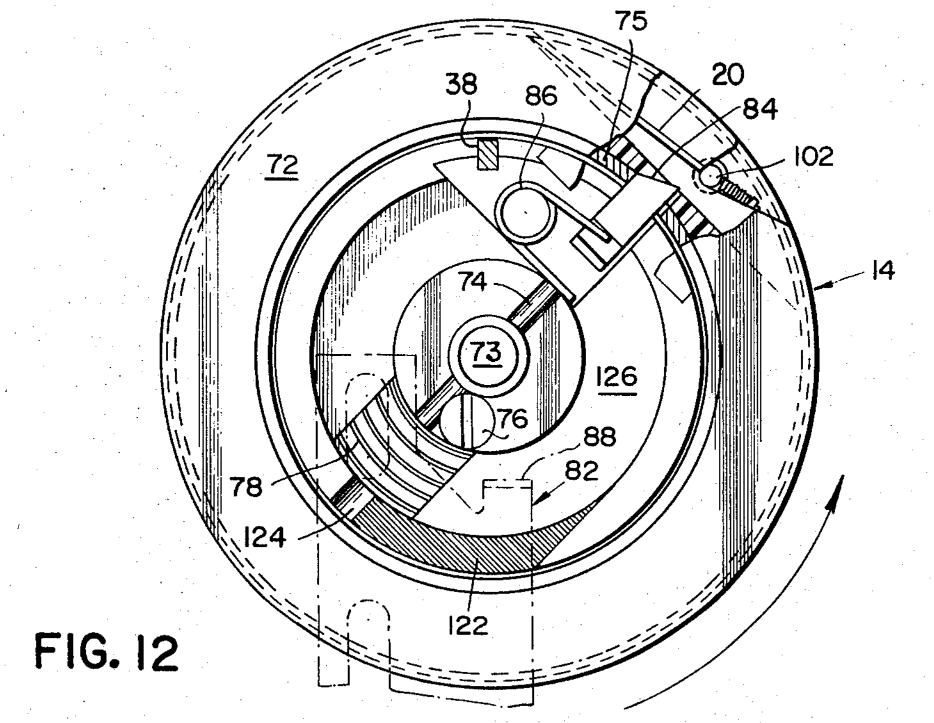
Figure 13:
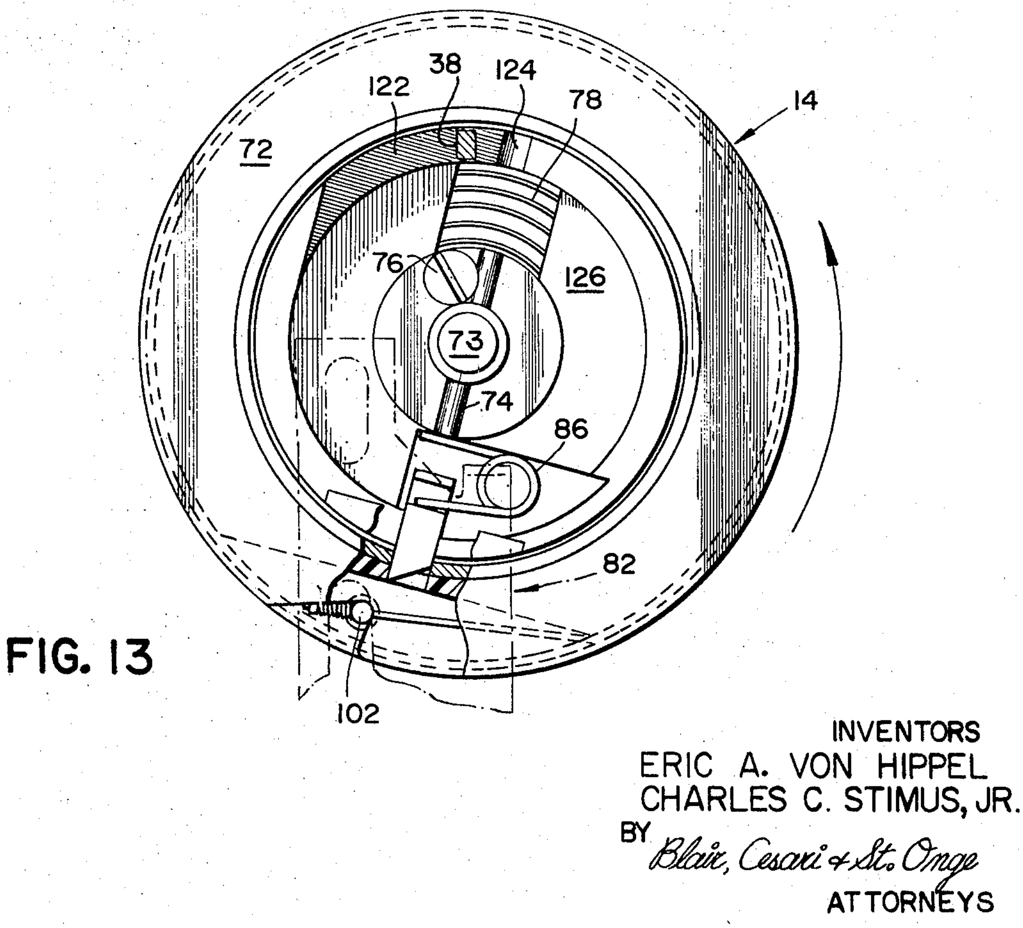

FIGS. 8—10 are side views of the drum shown in successive positions during an unloading cycle;

FIG. 11 is a view in perspective of the drum with the unloading mechanism fully extended; and FIGS. 12 and 13 are side views of the drum in successive positions during a reproduction cycle.

Referring again to FIGS. 1 and 3, the loader of the present invention is used in conjunction with a facsimile system 10 having a combined facsimile transmitter and receiver mounted in a case 12. At one end of the case, a drum 14 is journaled at its opposite ends in the case housing for rotation about a central shaft. The drum 14 has mounted thereon a document 16 which is to be reproduced and which is held tightly against the drum by crossbands 18. The crossbands 18 span across the drum and are connected at their respective ends to cables 20 which are wound in helical grooves in opposite ends of the drum. Magnets embedded in the surface of the drum hold the bands 18 tightly against the drum. The drum 14 is rotatably driven about its axis by a motor (now shown in FIG. 1) which is coupled to the drum shaft via gears 22.

A reading and reproducing head assembly 24 rides on a guide bar 26 and is driven axially along the drum by means of a lead screw 28 which is also connected to the driving gears 22. The longitudinal motion of the head and the rotational motion of the drum combine to create a helical motion of the transducer with respect to the document on the drum. A pair of spreader arms 30 have one end pivoted about a pivot 31 and the other end connected to the head assembly 24. These arms are free to open and close as the head assembly moves back and forth across the drum. The arms carry a cable assembly 33 which transmits information between the head assembly 24 and transmission and receiving elements which are connected to the facsimile system 10 via a cable 35. In practice, one or more of the transmission and receiving elements are mounted inside the case 10.

The head 24 has mounted on it a microswitch 32 (FIG. 2) which cooperates with a margin guide 34 against which the microswitch presses when the head advances to the position of the margin guide. When this occurs, the head has moved completely across the document and a solenoid 36 in circuit with the switch 32 and having a spring loaded arm held away from the drum when the solenoid is energized is deenergized to thereby release the arm 38 against the drum; this immediately stops the drum. A drawer 40 having a handle 42 is mounted below the drum to receive a document to be reproduced as will be explained in more detail subsequently; this drawer slides outwardly tangential to the drum during loading or unloading. A plastic cover 44 (shown more clearly in FIG. 3) is positioned adjacent the drum to shield the document during reproduction. Controls 46 are mounted on the case 12 to provide a means of starting and stopping the reproduction process and of loading or unloading the drum.

Figures 1, 2:
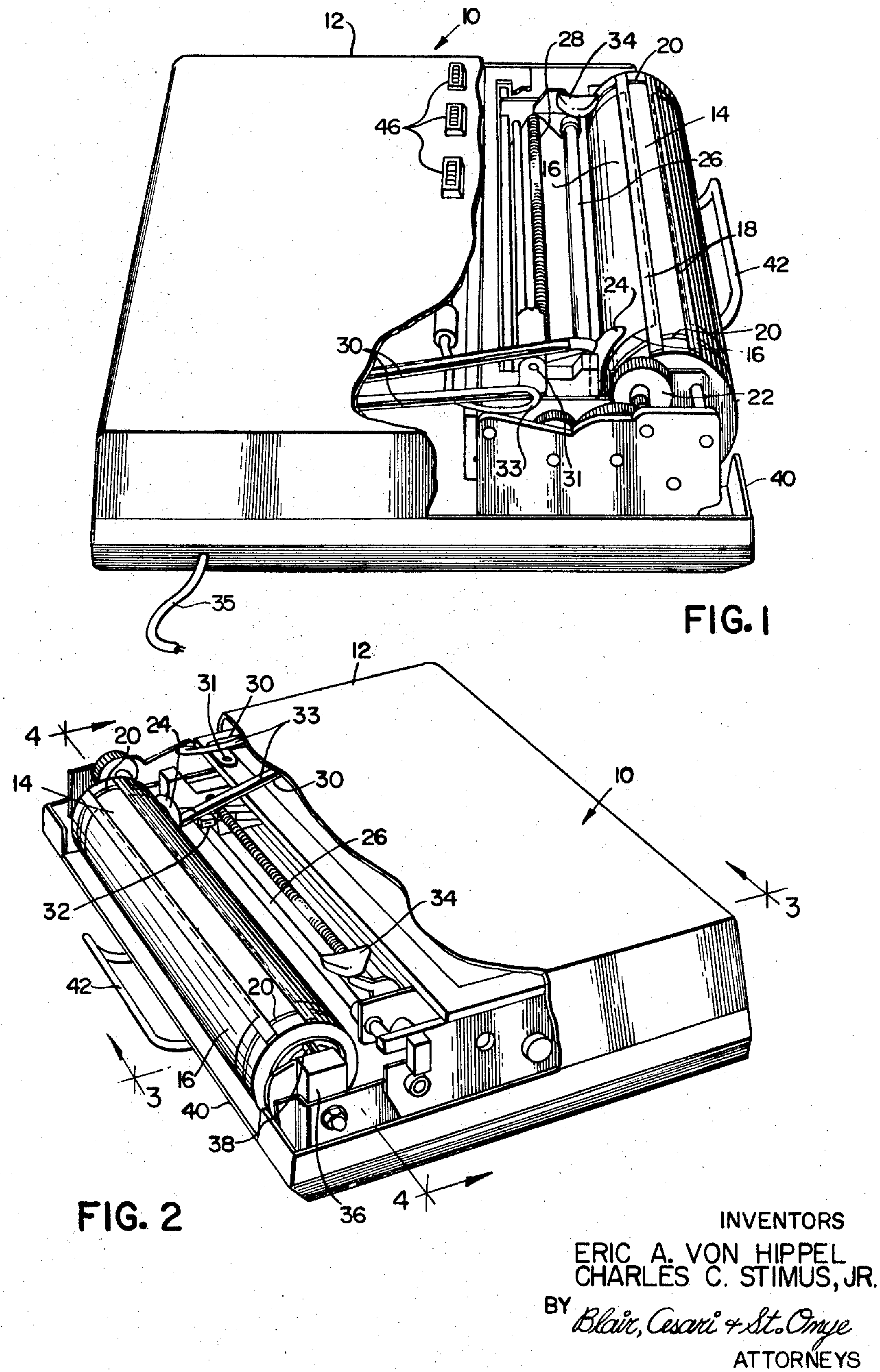
Figure 3:
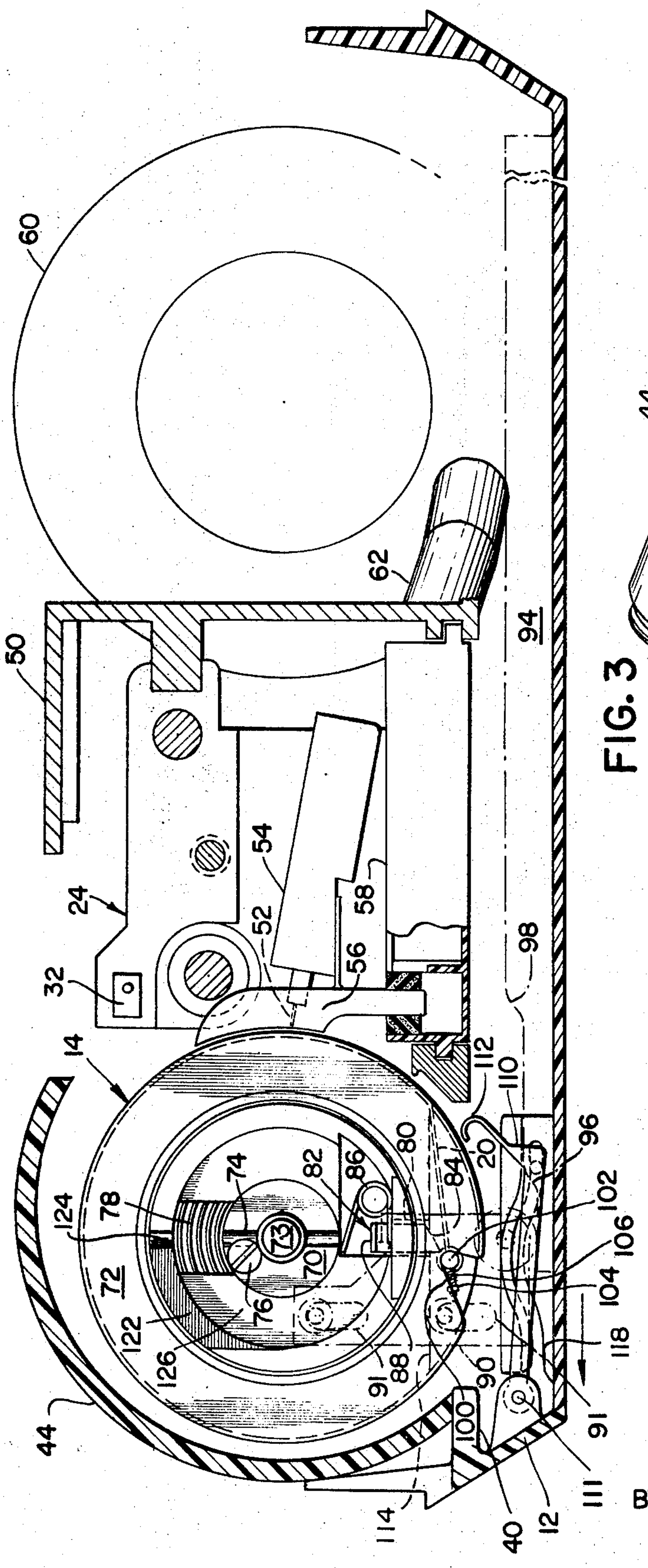
Figure 4:
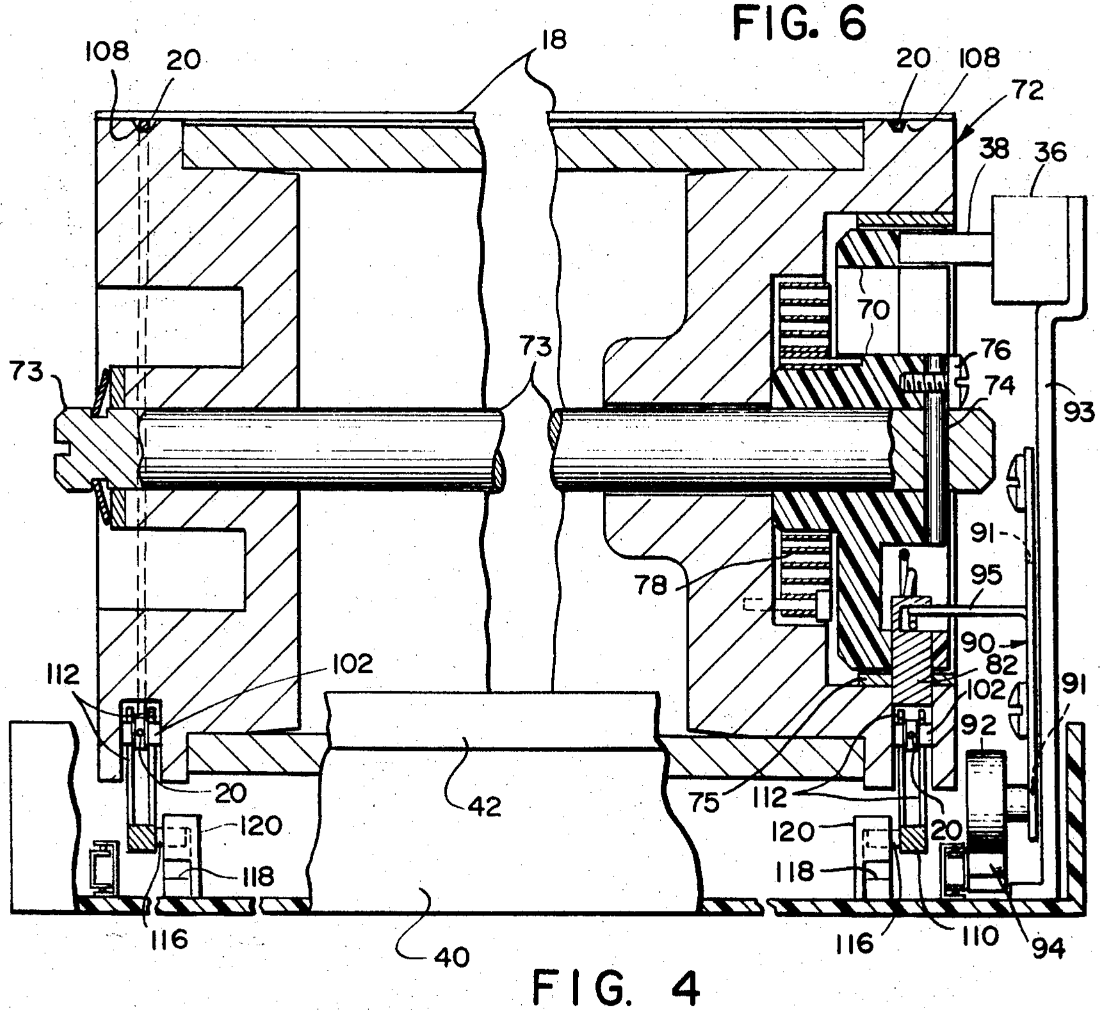

FIGS. 3 and 4 are side and front cross-sectional views respectively along the lines 3–3 and 4–4 respectively of FIG. 2 showing portions of the drum and head assembly in more detail. The head assembly 24 is carried in a frame 50 which provides support for it in addition to that provided by the guide bar 26. A pyrographic stylus 52, which is positioned in contact with the document 16 during reproduction, extends from a stylus casing 54 through the intake section of a vacuum nozzle 56 which is connected to an exhaust blower 60 by means of a conduit 62.

During operation of the facsimile system in its reproduction mode, the pyrographic stylus reproduces a document by passing pulses of electrical current through the document to thereby selectively "burn away" portions of the document in accordance with the message to be reproduced. This generates carbon particles as well as gaseous efflux caused by organic components in the paper being used for reproduction and this waste material is removed from the document by the vacuum nozzle 56 and the vacuum chamber 58. The construction of the vacuum chamber is described in more detail in my copending application Ser. No. 747,001 filed July 23, 1968 while the construction of the stylus assembly is described in more detail in copending application Ser. No. 755,097 filed Aug. 26, 1968.

The drum 14 has an inner hub 70 and an outer hub 72. The inner hub is connected to an axle 73 by means of a pin 74 extending through a slot in the axle; a screw 76 presses against the pin and prevents it from falling from its slot. A liner 75 is formed on the inner surface of the outer hub 74 for purposes to be explained subsequently. A spring 78 extends between the inner and outer hubs 70 and 72; this spring assists in rewinding the cables 20 onto the drum after they have been unwound for loading as described in more detail hereinafter. Access to the spring is provided through an aperture in the hub 70 (see FIG. 4). A well 80 extends from one portion of the inner hub 70 to the outer hub 72. A locking pin 82 having a beveled surface 84 is maintained in the well by means of a spring 86 extending between the pin and a portion of the inner hub 70. As long as the pin 82 extends between the inner and outer hubs 70 and 72 respectively, it locks the two hubs together so that rotation of one causes rotation of the other.

A lifter 90 having slotted grooves 91 is slidably carried by a portion 93 of the facsimile system chassis for vertical reciprocating motion, Since it is mounted on the chassis 93, the lifter 90 can move upwardly or downwardly with respect to the drawer 40 but otherwise remains in place as the drawer moves inwardly or outwardly. The lifter has an arm 95 r(FIG. 4) which presses against a lip 88 of the pin 82 to lift it upwardly; it also has a wheel 92 which rides on a cammed surface 94 for vertical reciprocating motion to thereby move the pin 82 vertically in the well 80 against the spring 86. The cammed surface 94 is formed on the inside portion of the drawer 40 and therefore moves inwardly and outwardly with respect to the lifter 90. The surface 94 has a first step 96 and a second step 98 on which the wheel 92 moves to thereby elevate the pin 80 in two separate stages for reasons to be described more fully hereinafter.

The drum 14 also has notches 100 in which retainer pins 102 are held by the cables 20 which pass through apertures in the pins and which terminate at one end of ferrules 104; the ferrules 104 are spaced from the pins by springs 106 which are concentric with the cable 20. The notches each have a rear wall sloping at an obtuse angle with respect to the drum surface against which the retainer pins 102 are held by the cables 20 and the springs 106. The other ends of the cables 20 are wound helically around the drum in slots 108 and are then attached to the drum at their far ends. Arms 110 having fingers 112 are pivotally attached to the drawer 40 at its forward end; they move forwardly with the drawer 40 through channels 114 cut along a chord of the drum. When they contact the pins 102, they pull these pins from their slots to unwind the cables 20 and their associated crossbands 18 from the drum. The arms 110 are attached to the drawer 40 at pivots 111; each arm has a side projection 116 (FIG. 4) which rides in a groove 118 in a cam plate 120 fixed to the chassis slightly above the drawer 40 and stationary with respect to the drawer.

Figures 5, 6:
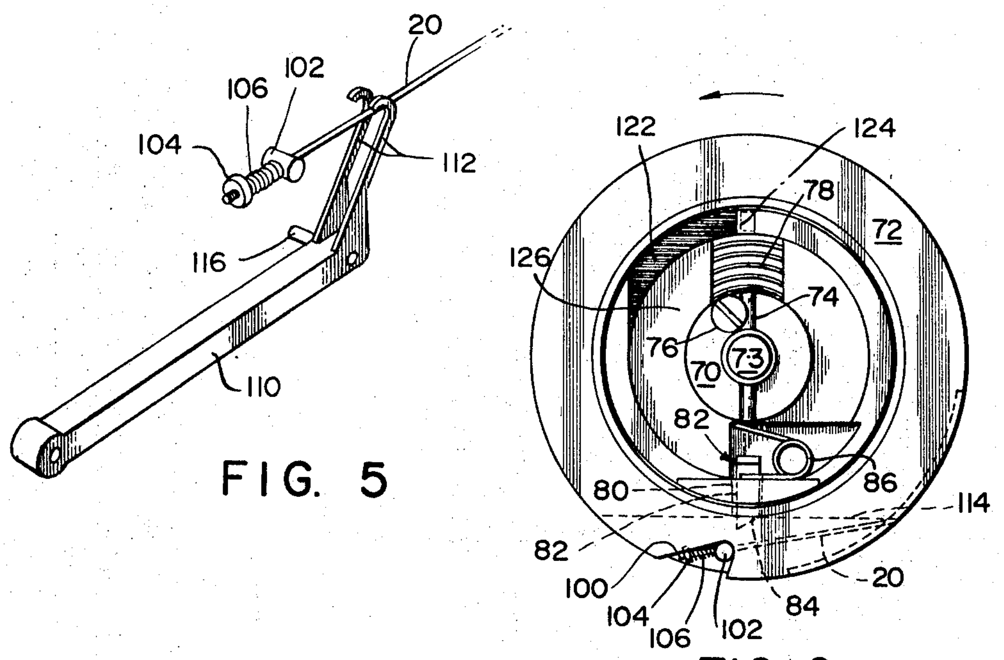
FIG. 5 is a view in perspective of a portion of the drum unwinding mechanism.
FIG. 6 is a side view of the drum taken along the same section as the section 3–3 in FIG. 1 and showing further details of the drum.

FIG. 5 shows an arm 110 in greater detail. The fingers 112 are adapted to grasp the pin 102 on opposite sides of the cable 20 when they are brought into contact with the pin by the cam plate 120. When this occurs, the pin 102 is moved away from the rear wall of the notch 100 in which it sits and toward the ferrule 104 against the spring 102. As the arm 110 moves further along the cam plate 120, it pulls the pin 102 completely out from the notch 100 and the cables 20 are then unwound from the drum. The pins 102 have symmetrical double levels to seat them securely in the notches 100 and to prevent sideward motion of the arms 112.

Figure 7:
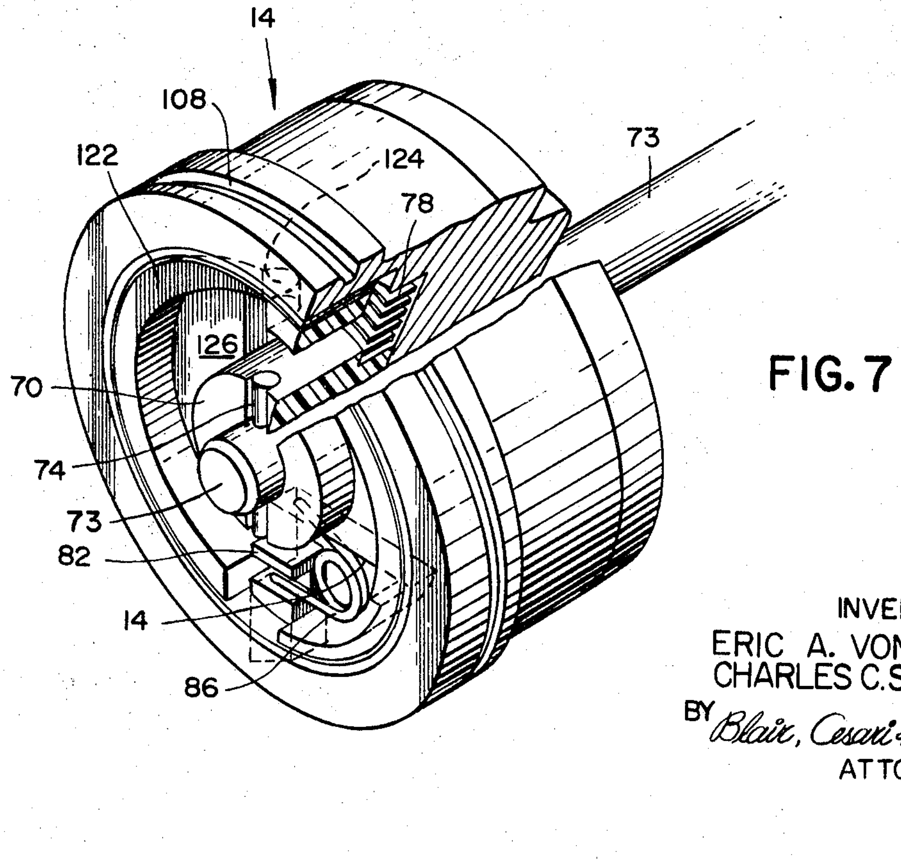
FIG. 7 is a view in perspective of one end of the drum and showing the drum locking mechanism in detail.

FIGS. 6 and 7 show further aspects of the drum construction in greater detail. The inner hub 70 of the drum is keyed to the axle 73 by the pin 82 and thus rotates with the axle when the axle is driven from the gears 22 (FIG. 1). The outer hub 72 bears upon the drum axle 73 but is not directly connected to it; however, in its normal condition it is constrained to rotate with the hub 70 by the locking pin 82 extending between the inner hub 70 and the outer hub 72. When this pin is removed, the hub 72 can freely rotate with respect to the hub 70 for loading or unloading. The hub 72 has an arcuate groove 122 (FIG. 7) formed inwardly of its periphery; this groove terminates in a slot 124 for the reception of the plunger arm 38 of the solenoid 36. When the microswitch 32 contacts the margin guide 34, it deenergizes the solenoid 36 and releases the spring-loaded arm 38 against the outer hub 72. The arm 38 rides around the rim of the hub 72 until it encounters the groove 122; it then drops down into this groove and thence into the slot 124 to immediately stop the drum rotation. This ensures that the drum is indexed to the same rotational position each time after a reproduction cycle to thereby facilitate the loading and unloading of a document. A recessed annular portion 126 between the inner and outer hubs provides clearance for the lifter arm 95.

The operation of the document loader mechanism will now be explained in further detail with reference to FIGS. 8 through 10 of the drawings which are side views of the drum 14, with portions broken away, in successive stages of unloading. As long as the drum 14 is not rotating for reproduction purposes, the arm 38 of the solenoid 36 holds the inner hub 70 stationary with respect to the case 12. The outer hub 72, which is keyed to the inner hub, is also stationary. When a document is to be loaded or unloaded, the outer hub 72 must be released from the inner hub 70. This is accomplished by sliding the drawer 40 inwardly and outwardly on the chassis to move the lifter 90 on the cammed surface 94; this moves the locking pin 82 extending between the hub 70 and the hub 72 and also moves the arms 110 relative to the cam plate 120.

When the drawer is fully in as in FIG. 8, the lifter 90 is at its lowest position on the cammed surface 94 and the pin 82 therefore extends between the inner and outer hubs 70 and 72 respectively. At this time, the arm 110, which is attached to the drawer 40 at the pivot 111, also lies at its lowest point along the cam plate 120 and therefore the fingers 112 are completely free from interference with the drum 14.

As the drawer is pulled outwardly (to the left) as shown in FIG. 9, the cammed surface 94 forces the wheel 92 of the lifter 90 up over the first step 96 on the cammed surface. The lifter arm 95 thereupon raises the pin 82 in the well 80 so that the upper portion of the beveled surface 84 of the pin 82 is brought slightly inwardly of the inner surface 73 of the outer hub 72; it will be noted that the lower portion of the beveled surface 84 still lies below the surface 73. At this time, therefore, the outer hub 72 is prevented from rotating in a counterclockwise direction with respect to the inner hub 70 by means of the lower portion of the pin 82.

However, the outer hub 72 may be rotated in a clockwise direction with respect to the inner hub 70 at this time since the surface 73 of the hub 72 will press against the beveled surface 84 of the pin and lift this pin fully out of the well 80 against the spring 86; thereafter the pin will ride on the surface 73 until the lifter arm 95 lifts it further from well 80. This will occur when the lifter 90 rises up on the second step 98. If the hub 72 is rotated in a counterclockwise direction prior to this time, the spring 86 will again force the pin 82 partly into the well 80 when the pin and the well are aligned and further counterclockwise rotation of the hub 72 will thus be prevented. Thus, as long as the drawer 40 is extended outwardly, the counterclockwise rotation of the hub 72 is limited by the action of the spring 86 on the pin 82. This insures that the spring 78 between the inner and outer hubs, which is biased to rotate the hub 72 in a counterclockwise direction when the drawer 40 is again moved inwardly, will not whip the drum around in a "-window shade" action and thereby unwind the spring.

While the pin 82 is being lifted from the well 80, the arm 110 is being lifted on the cam plate 120 by means of the side projection 116 which rides in the groove 118 of the cam plate 120. The fingers 112 are thereby carried upwardly into the channel 114 preparatory to grasping the retainer pin 102. When the drawer is then moved slightly outwardly of the position shown in FIG. 9, the fingers 112 grasp the pins 102 at either end of the drum 14 and pull them against the springs 106 and out of the notch 100. At this time, the pin 82 is lifted fully out of the well 80 since the outer hub 72 is prevented from reverse (counterclockwise) rotation by means of the fingers 112 which pull on the pins 102 and the cable 20.

This is shown more clearly in FIG. 10 which illustrates the position of the hub 72 after the drawer 40 has been pulled out a sufficient distance to enable the arms 110 to grab the pins 102 and withdraw them from the drum 14. As the cables 20 are drawn from the outer hub 72 of the drum, they cause this hub to rotate with respect to the inner hub 70. This rotation drives the upper part of the beveled surface 84 of the pin 82 up onto the surface 75 which protects the inner surface of the hub 74 from wear caused by the pin 72. As the drawer is pulled outwardly further, the wheel 92 rides up the step 96 on the cammed surface 94 and thereby causes the lifter arm 95 to pull the pin 82 against the spring 86 and away from the surface 75. The pin 82 is then held in this position as long as the drawer 40 is pulled out and the hub 72 can continue to rotate in a clockwise direction with respect to the stationaary hub 70.

FIG. 11 is a stylized pictorial view of the drum and drawer when the drawer 40 has been fully extended. In order to load a document onto the drum, the operator places the document 16 face downward on the crossbands 18 with one hand while holding the handle 42 of the drawer with the other hand. When the document is properly positioned on the crossbands, the operator slides the drawer inwardly toward the drum; this is assisted by the spring 78 which extends between the inner and outer hubs 70 and 72 respectively, The sequence of operations described in connection with FIGS. 8—10 is then reversed, that is, the outer hub 72 rotates in a counterclockwise direction with respect to the inner hub 70 and the wheel 92 descends down the steps 98 and 96 respectively of the cammed surface 94 to cause the spring 86 to lower the pin 82 into the well 80 in two separate stages. At the same time, the projections 116 of the arms 110 reseat themselves in the groove of the cam plate 120 and the arms 110 release the retainer pins 102 after guiding them into the notches 100 in the drum. After the drawer 40 has been fully pushed in, therefore, the fingers 112 are again removed from the drum, and the inner and outer hubs are again locked to each other for simultaneous rotation.

FIGS. 12 and 13 show the drum 14 at two successive rotational positions during a reproduction cycle after the drum has received a document to be reproduced. The axle 73 of the inner hub 70 is driven in the counterclockwise direction by a motor (not shown). Since the pin 82 is fully extended into the well 80 between the inner and outer hubs, it locks these hubs together for simultaneous rotation. During this time, the arm 95 of the lifter 90 rides in the cylindrical recess 126 extending between the inner and outer hubs; since the drawer is motionless during this period, the lifter remains stationary. During each rotational cycle of the drum, the lip 88 of the pin 82 rides over the lifter arm 95 but does not come into contact with it. Thus, the rotation of the drum is unimpeded by the presence of the lifter arm.

When it is desired to stop the drum, the solenoid 36 is actuated. In the case of a facsimile transmitter, this occurs when the head assembly 24 drives against the margin guide 34 to thereby open the switch 32 which is connected to the solenoid 36. The time at which this occurs, and thus the length of the reproduction cycle, is controlled by adjusting the position of the guide 34 along the guide bar 26. Opening the switch 32 deenergizes the solenoid 36 and releases the plunger arm 38. The arm 38 then rides along the surface 121 of the hub 72 as the drum rotates and moves inwardly along the arcuate surface 122 into the notch 124 when these are aligned with the arm. When this occurs, the arm 38 seats itself in the notch and brings the drum 14 to a sudden halt as it strikes the side wall of the notch. Thus the drum 14 is halted in the same angular orientation after each reproduction cycle regardless of the length of the cycle so that the pins 102 are in correct alignment for mating with the fingers 112 during the subsequent unloading. In the case of a facsimile receiver, the operation is similar except that the solenoid 36 is actuated on receipt of an appropriate signal from the facsimile transmitter to which it is connected.

From the foregoing it will be seen that we have provided an improved document loader for a facsimile system having a rotary drum. The loader is convenient to use and requires no special care of skill on the part of the operator. It rapidly loads a document onto the drum for reproduction or unloads it after reproduction without requiring any direct contact between the operator and the drum. A spring loaded drum is utilized to assist in the loading operation and safety interlocks are provided to insure that the drum cannot accidentally unwind during the loading or unloading operation. An adjustable margin guide is provided to allow the reproduction of documents of differing length or of portions of documents only so that the length of the reproduction cycle may be adjusted to the length of the document or document portion which is to be reproduced. An indexing mechanism is incorporated into the drum to ensure that the drum comes to rest in the same angular orientation after each reproduction cycle regardless of the length of the cycle to ensure that the drum is properly oriented for subsequent unloading.

It will thus be seen that the objects set forth above, among those made apparent from the preceding description, are efficiently attained and, since certain changes may be made in the above constructions without departing from the scope of the invention, it is intended that all matter contained in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In a facsimile apparatus of the type which has a rotatable drum for mounting a document thereon, an electrooptical transducer positioned adjacent the drum and movable over said document in a first direction parallel to the axis of said drum, a means for rotating the drum and a means for driving the transducer along the drum as the drum is rotated, a limit switch for shutting off the drum rotating means and the transducer drive means when activated, and activating means for activating said limit switch on contact therewith, the improvement wherein:

a. said limit switch and said activating means are adjustably positionable with respect to each other forming path-limiting means for determining the length over which the transducer is driven during a given reproduction cycle and wherein at least one of said switch and said activating means is mounted for movement with said transducer, and wherein b. said limit switch is connected in an electrical circuit with a solenoid having an arm extending therefrom, said solenoid being operable on activation of the limit switch to place said arm in engagement with a stop on said drum to hold said drum in a predetermined rotational position, and wherein c. said stop comprises a recessed portion located on a segment of said drum for receiving said arm therein to thereby lock said drum in said predetermined position.

2. Apparatus according to claim 1 in which the drum is inwardly contoured that the arm, when released from the solenoid, rides along said contour of the drum until said recess is reached, and then drops into said recess to stop further rotary motion and to lock the drum in the same predetermined position during each reproduction cycle independent of the time of release of the arm.

3. Apparatus according to claim 1 in which the transducer is driven from the same driving means as is the drum to thereby maintain synchronism between the motion of the transducer and the motion of the drum.

4. Apparatus according to claim 1 in which the limit switch is positioned on the transducer, the activating means being adjustably positionable with respect to the transducer to activate said switch when the switch comes into mechanical contact therewith.

5. Facsimile apparatus comprising:

A. a cylindrical drum for receiving a document to be reproduced;

B. an electrooptical transducer positioned adjacent the drum and movable in a first direction parallel to the drum for scanning said document;

C. driving means for providing relative motion between the transducer and the drum;

D. a pair of grooves extending helically around the drum at opposite ends thereof;

E. a pair of cables, each cable positioned in a respective groove for winding around the drum and connected to the drum at one end thereof;

F. a pair of crossbands extending between the cables for receiving a document when the cables are extended from the drum; and G. means for engaging the cables to withdraw the cables from the drum whereby the crossbands are extended for receiving a document.

6. Facsimile apparatus according to claim 5 in which the drum has notched portions extending inwardly from the face of the drum and overlapping with segments of the helical grooves, the notched portions being adapted to receive the free end of said cables therein when the cables are wound around the drum.

7. Facsimile apparatus according to claim 6 in which each cable has a spring affixed to the free end thereof and a retainer connected to said spring, each said retainer being adapted to fit into one of said notched portions to thereby retain each said cable in its respective groove when said cables are wound fully around said drum, each said spring being compressible to release the respective retainer and cable from its corresponding notched portion when the cables are to be unwound from the drum.

8. Facsimile apparatus according to claim 5 in which each said notched portion has a wall inclined at an acute angle to the drum surface and extending in a direction opposite to the direction in which the drum rotates during unloading, each said retainer being held against the corresponding wall inwardly of the drum surface when said cables are helically wound around said drum and being movable along the respective wall out of said notched portion when its associated spring is compressed for removal of the corresponding cable from the drum.

9. Facsimile apparatus according to claim 6 in which the means for engaging said cables comprises a pair of arms, each pair adapted to engage a corresponding cable therein, said arms being mounted on a platform that is tangentially movable with respect to said drum whereby said cables are engaged by said arms as said platform is moved outwardly from said drum.

10. Facsimile apparatus according to claim 9 in which said drum has a recessed portion on each side of the drum adjacent said helical grooves and aligned therewith, each said recessed portion being adapted to pass one of the cable-engaging means therethrough to enable the respective means to engage the corresponding cables when said cables are to be drawn from said drum.

11. Facsimile apparatus according to claim 10 in which said arms are brought into engagement with said cables through said recessed portion by means of a cammed surface which engages with said arms when said platform is moved outwardly of said drum and which moves said arms in a fixed path during said engagement to draw said cables off said drum.

12. Facsimile apparatus according to claim 5 in which said drum includes a drum surface for receiving a document, an axle for rotating said surface, and a spring connected between said axle and said drum surface for restraining relative motion therebetween, said spring being extended when the cables are drawn off the drum and being relaxed when the cables are again wound thereon, whereby a bias for loading a document onto the drum is created by the spring.

13. Facsimile apparatus according to claim 12 in which the drum has an inner hub connected to the axle for movement therewith, an outer hub connected to the drum surface, and means for selectively locking the inner and outer hubs together for simultaneous rotation.

14. Facsimile apparatus according to claim 13 in which the locking means comprises a pin seated in one of the hubs, the pin being extendable to the other of the hubs to lock the hubs together and being disengageable from the other hub on contact with an actuator to free the hubs for separate motion.

15. Facsimile apparatus according to claim 13 in which the inner hub remains stationary when a document is to be loaded onto or unloaded from the drum, the outer hub rotating with the drum surface to receive or discharge the document, and in which the means for locking the hubs together comprises a locking pin connected to one of the hubs and extendable between the hubs when said hubs are to be locked together, the pin being retractable into said one hub when the hubs are to rotate freely with respect to each other.

16. Facsimile apparatus according to claim 15 in which said pin is mounted in said inner hub and is extendable into an aperture in said outer hub, the pin being removable from said aperture by a lifting element which is actuated when said cables are withdrawn from said drum.

17. Facsimile apparatus according to claim 16 in which said lifting element rides on a cammed surface on said platform adapted to cause said lifting element to remove said pin from the aperture in the outer hub when the platform is moved outwardly of the drum.

18. Facsimile apparatus according to claim 17 in which the pin has a beveled surface on the portion extending into the aperture in the outer hub, and in which the lifting element and cam are adapted to remove the pin in two stages, the pin being lifted from the aperture during the first stage so as to position a portion of the beveled surface of the pin adjacent a bearing surface of the inner hub whereby the pin may be further lifted by said bearing surface when the outer hub is rotated in a first direction with respect to the inner hub but is forced back into its aperture when the outer hub is rotated in the opposite direction with respect to the inner hub, and the second stage causing the pin to be fully disengaged from the other hub whereby the outer hub may freely rotate with respect to the inner hub.